(12) United States Patent
Laing (10) Patent No.: US 10,430,538 B2
(45) Date of Patent: Oct. 1, 2019

(54) TEST CAPABILITY-BASED PRINTED CIRCUIT BOARD ASSEMBLY DESIGN

(71) Applicant: Mentor Graphics Corporation, Wilsonville, OR (US)

(72) Inventor: Mark Laing, Lafayette, CO (US)

(73) Assignee: Mentor Graphics Corporation, Wilsonville, OR (US)

( * ) Notice: Subject to any disclaimer, the term of this patent is extended or adjusted under 35 U.S.C. 154(b) by 138 days.

(21) Appl. No.: 15/419,890

(22) Filed: Jan. 30, 2017

(65) Prior Publication Data

US 2018/0218099 A1    Aug. 2, 2018

(51) Int. Cl.
  *G06F 17/50* (2006.01)
  *G01R 31/317* (2006.01)
(52) U.S. Cl.
  CPC ... *G06F 17/5045* (2013.01); *G01R 31/31704* (2013.01); *G06F 17/5022* (2013.01); *G06F 2217/14* (2013.01); *G06F 2217/74* (2013.01)
(58) Field of Classification Search
  USPC .......................................................... 716/106
  See application file for complete search history.

(56) References Cited

U.S. PATENT DOCUMENTS

| | | | |
|---|---|---|---|
| 2005/0080502 A1* | 4/2005 | Chernyak | G06F 17/50 700/97 |
| 2012/0297356 A1* | 11/2012 | Wu | G06F 17/5081 716/136 |

* cited by examiner

*Primary Examiner* — Bryce M Aisaka
(74) *Attorney, Agent, or Firm* — Mentor Graphics Corporation (57) ABSTRACT

This application discloses a computing system implementing a schematic capture tool to utilize physical test capabilities of a manufacturer of a printed circuit board assembly during generation of a logical design for the printed circuit board assembly. The schematic capture tool can utilize the physical test capabilities of the manufacturer to trim a list of parts representing electronic components available for use in the printed circuit board assembly, and generate the logical design for the printed circuit board assembly utilized the trimmed list of parts. The schematic capture tool can utilize the physical test capabilities of the manufacturer to determine which nets in the logical design to assign test points. The schematic capture tool can provide an indication of the assigned test points to a layout tool, which can include the test points in a layout design for the printed circuit board assembly based on the assignment.

20 Claims, 4 Drawing Sheets

TEST CAPABILITY-BASED PRINTED CIRCUIT BOARD ASSEMBLY DESIGN

TECHNICAL FIELD

This application is generally related to electronic design automation and, more specifically, to test capability-based printed circuit board assembly design.

BACKGROUND

The development of electronic devices with printed circuit boards typically involves many steps known as a design flow. This design flow typically starts with a specification for a new electronic device to be implemented with a printed circuit board. The specification of the electronic device can be transformed into an electronic device design, such as a netlist, for example, by a schematic capture tool or by synthesizing a logical design, sometimes referred to as a register transfer level (RTL) description of the electronic device. The netlist may be specified in an Electronic Design Interchange Format (EDIF) or the like, which can describe nets or connectivity between various components or parts in the electronic device design.

The design flow may continue by verifying functionality of the electronic device design, for example, by simulating, emulating, or prototyping the electronic device design and verifying that the results of the simulation or emulation correspond with an expected output from the electronic device design. The functionality also can be verified by formally verifying with one or more solvers or statically checking the electronic device design for various attributes that may be problematic during operation of the electronic device built utilizing the electronic device design.

Once the electronic device design has been functionally verified, the design flow may utilize the logical design to generate a layout design for the electronic device. This procedure can be implemented in different ways, but typically, through the use of a layout tool, which can place and interconnect various components or parts into a representation of a printed circuit board. For example, the layout tool implemented in a computing system can present a graphical view of the printed circuit board and allow a designer to utilize the layout tool to place parts from a library onto the printed circuit board in the graphical view.

The design flow may perform one or more design for manufacturability (DFM) procedures on the layout design, which can determine whether the electronic device described in the layout design can be manufactured. The design for manufacturability procedures can include a design for fabrication (DFF) processes, a design for assembly (DFA) processes, a design for test (DFT) processes, or the like. The design for fabrication processes can determine whether a bare printed circuit board can be fabricated based on the layout design. The design for assembly processes can determine whether components can be disposed or coupled to the printed circuit board during assembly of the electronic device. The design for test processes can identify whether testing procedures can be utilized on manufactured electronic devices, for example, to detect process defects during assembly, perform electrical verification of a manufactured electronic device, or the like.

The design for test processes may be able to identify whether the electronic device, when built, can be tested by a particular fabricator to identify process defects, such as whether a component has been placed and soldered to the printed circuit board correctly. The design for test processes also may determine whether the electronic device can be electrically verified during testing procedures, for example, by performing at speed testing of the electronic device and sampling signaling at various test points in the electronic device under test. Often, however, practical constraints, such as fabricator test capabilities, space on the layout design available for test points, or the like, may result in the testing procedures to not being able to verify a portion of the electronic device. This inability to test the portion of the electronic device can reduce test coverage and leave the electronic devices built based on the layout design susceptible to undetected manufacturing-related faults. In other instances, the design for test processes may determine that a fabricator has the capability of testing manufactured electronic devices for the layout design, but the testing procedures may be time-consuming, expensive, or both than other available options. In these instances, the developer of the electronic system can decide whether to re-design the electronic device or to accept the reduced test coverage and/or more time-consuming, expensive, or both testing procedures and move forward with production of the electronic design.

SUMMARY

This application discloses a computing system implementing a schematic capture tool to utilize physical test capabilities of a manufacturer of a printed circuit board assembly during generation of a logical design for the printed circuit board assembly. The schematic capture tool can utilize the physical test capabilities of the manufacturer to trim a list of parts representing electronic components available for use in the printed circuit board assembly, and generate the logical design for the printed circuit board assembly utilized the trimmed list of parts. The schematic capture tool can utilize the physical test capabilities of the manufacturer to determine which nets in the logical design to assign test points. The schematic capture tool can provide an indication of the assigned test points to a layout tool, which can include the test points in a layout design for the printed circuit board assembly based on the assignment. Embodiments will be described below in greater detail.

DETAILED DESCRIPTION

Illustrative Operating Environment

Figure 1:
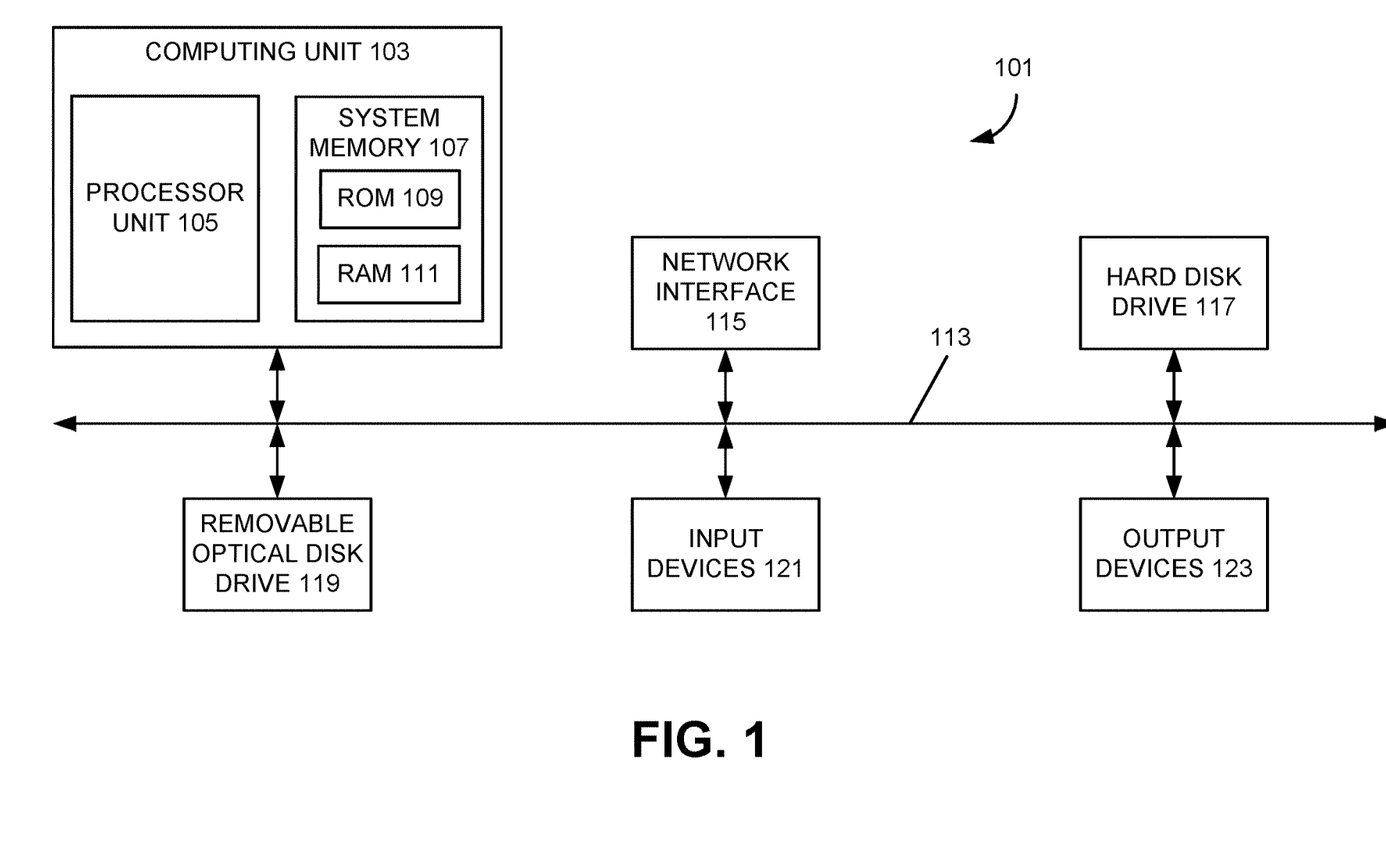
FIGS. 1 and 2 illustrate an example of a computer system of the type that may be used to implement various embodiments.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
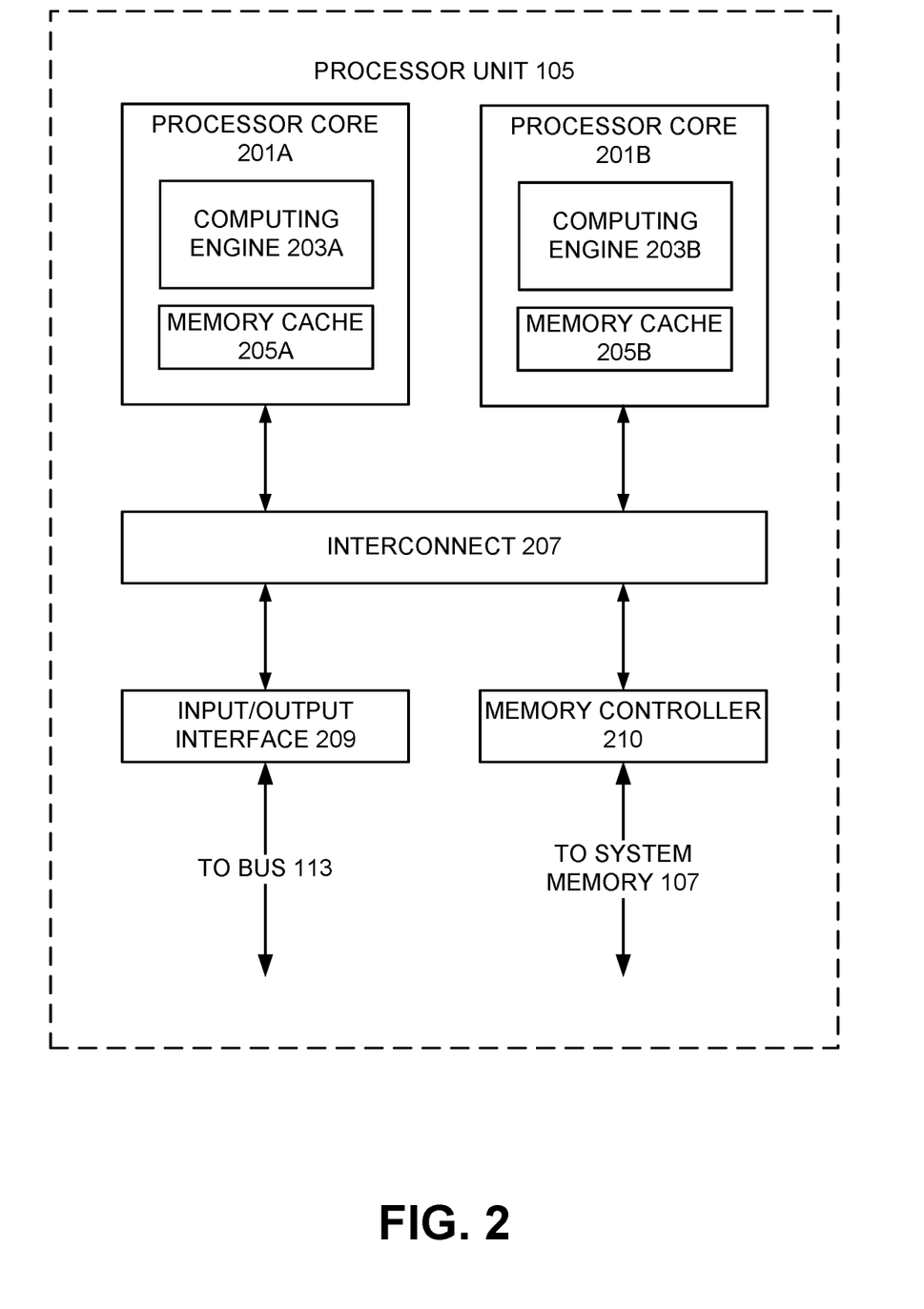

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Figure 3:
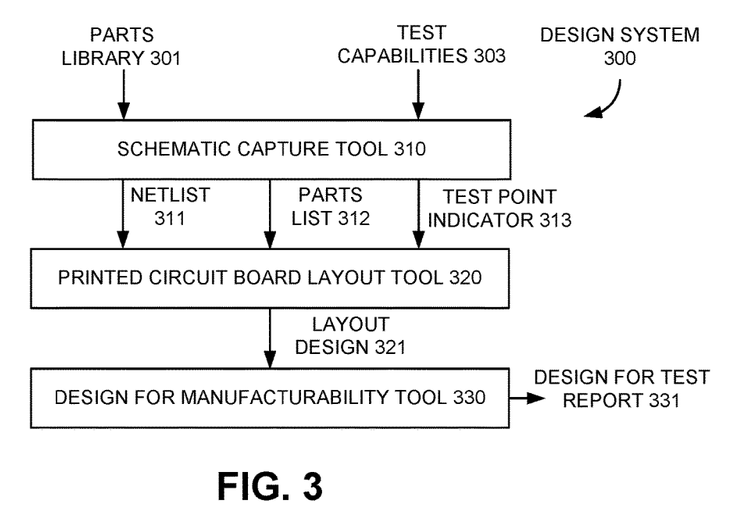
FIG. 3 illustrates an example of a design system with a schematic capture tool to utilize test capabilities of a manufacturer to generate a logical design of a printed circuit board assembly according to various embodiments.

Test Capability-Based Schematic Capture of a Printed Circuit Board Assembly Design FIG. 3 illustrates an example of a design system 300 with a schematic capture tool 310 to utilize test capabilities 303 of a manufacturer to generate a logical design of a printed circuit board assembly according to various embodiments. Referring to FIG. 3, the design system 300 can be a distributed design environment, which allow for a design of a printed circuit board assembly to be performed by different communicating tools or systems.

The design system 300 can include a schematic capture tool 310 to receive a parts library 301 and test capabilities 303 of a manufacturer. The parts library 301 can include parts that represent electronic components available for use in a printed circuit board assembly. The parts can describe the electronic components, for example, by identifying types of the electronic components and the pins, ports, or interfaces of the electronic components. In some embodiments, the parts also may describe electrical characteristics of the electronic components and/or include physical characteristics of the electronic components, such as footprints of the electronic components, sizes of the electronic components, shapes of the electronic components, or the like. The parts in the parts library 301 can describe test procedures or test equipment to utilize to test the electronic components represented by the corresponding parts.

The test capabilities 303 can describe types of tests the manufacturer can perform on the printed circuit board assembly, which equipment the manufacturer can utilize to perform the tests on the printed circuit board assembly, a throughput of the tests and test equipment, an expense associated with the tests, or the like. In some embodiments, the manufacturer may support or be able to perform one or more of an Automated Optical Inspection (AOI) test, an Automated X-Ray Inspection (AXI) test, an In-circuit Test (ICT), a Boundary Scan test, a Flying Probe Test (FPT), manual inspection tests, manual electrical tests, or the like.

The schematic capture tool 310 can generate a logical design for the printed circuit board assembly utilizing the parts from the parts library 301. The logical design for the printed circuit board assembly can include a netlist 311 and a parts list 312. The netlist 311, for example, specified in an Electronic Design Interchange Format (EDIF), can describe nets or connectivity between various components or instances. The parts list 312 can include multiple parts from the parts library 301, which can correspond to the components or instances described in the netlist 311.

The schematic capture tool 310 can utilize the test capabilities 303 of the manufacturer for the printed circuit board assembly to modify the development process of the logical design for the printed circuit board assembly. The schematic capture tool 310 can redact or trim the parts in the parts library 301 available for inclusion in the logical design of the printed circuit board assembly. The schematic capture tool 310 can utilize the test capabilities 303 to identify which of the parts represent electronic components that, if included in the printed circuit board assembly, would be untestable by the manufacturer and remove the ability of untestable parts from being included in the logical design for the printed circuit board assembly. For example, when a part in the parts library 301 corresponds to a Ball Grid Array (BGA) package, a test of an electronic component represented by that part would be performed by x-ray techniques, as the pins lie underneath the electronic component disposed on the printed circuit board assembly. When the test capabilities 303 for the manufacturer do not include the ability to perform an x-ray test, such as an Automated X-Ray Inspection (AXI) test, the schematic capture tool 310 can exclude the part from being utilized in the logical design for the printed circuit board assembly. The schematic capture tool 310 can identify how to test each electronic component represented by the corresponding parts, for example, identifying test procedures or test equipment the manufacturer should utilize to test the electronic components. The schematic capture tool 310 can identify how to test each electronic component from a description of a corresponding part in the parts library 301, or by analyzing the physical characteristics of the electronic components described in the parts to ascertain how a manufacturer would test the electronic components.

As will be described below in greater detail, the schematic capture tool 310 can utilize an amount of space available for test points and the test capabilities 303 of the manufacturer to assign test points during a logical design phase. The schematic capture tool 310 can incorporate the assignment of test points into the netlist 311 and/or parts list 312 or outputted separately as a test point indicator 313, which can direct, prompt, or advise downstream tools in the design system 300, such as a printed circuit board layout tool 320, where to include test points into a physical design of the printed circuit board assembly.

The design system can include the printed circuit board layout tool 320 to receive the logical design of the printed circuit board assembly, such as the netlist 311 and the parts list 312 from the schematic capture tool 310, and convert the logical design into a physical design or layout design 321 of the printed circuit board assembly. The printed circuit board layout tool 320 can provide a design environment to layout the netlist 311 into the layout design 321 by placing parts or components from a parts list 312 onto the representation of printed circuit board. The layout design 321 can describe the electronic device for the product in terms of various components placed and interconnected on a representation of a printed circuit board.

The printed circuit board layout tool 320 can output a display presentation that, when displayed by a display device, can provide an user interface to the design environment, allowing the printed circuit board layout tool 320 to generate the layout design 321 in response to user input. The display presentation can include a graphical display window including at least one representation of the layout design 321 and include various tools or embedded functionality that can allow placement of parts or components from the parts list 312 into the layout design 321.

The layout design 321 initially can represent a blank print circuit board, for example, having dimensions corresponding to one or more of the physical constraints. The printed circuit board layout tool 320 can receive user input, for example, based on the display presentation, which can prompt the printed circuit board layout tool 320 to perform various updates to the layout design 321 based on the netlist 311, such as place parts selected from the parts list 312 in the layout design 321, route traces between the placed parts, or the like. In some embodiments, the printed circuit board layout tool 320, in response to a user selection of a part from the parts list 312, can access a library to identify a component model corresponding to the selected part capable of being placed in the representation of the layout design 321.

The printed circuit board layout tool 320 can identify the assignment of test points by the schematic capture tool 310, for example, from the test point indicator 313 or within the netlist 311 and/or parts list 312. The printed circuit board layout tool 320 can utilize the assignment of the tests points to add test points to the layout design 321. In some embodiments, the assignment of test points may identify which nets in the net list 311 for the printed circuit board layout tool 320 to add test points in the layout design 321, which type of test point to add, or the like.

The design system 300 can include a design for manufacturability (DFM) tool 330 to determine whether the layout design 321 can be manufactured and tested by one or more fabricators. The design for manufacturability tool 330 can perform a design for fabrication (DFF) analysis, a design for assembly (DFA) analysis, a design for test (DFT) analysis, or the like. The design for manufacturability tool 330 can perform the design for fabrication analysis to determine whether a bare printed circuit board can be fabricated based on the layout design. The design for manufacturability tool 330 can perform the design for assembly analysis to determine whether components can be disposed or coupled to the printed circuit board during assembly of the electronic device. The design for manufacturability tool 330 can perform the design for test analysis to identify whether testing procedures can be utilized on manufactured electronic devices, for example, to detect process defects during assembly, perform electrical verification of a manufactured electronic device, or the like. In some embodiments, the design for manufacturability tool 330 can output a design for test report 331, which can identify whether the printed circuit board assembly described in the layout design 321 can be tested, whether portions of the printed circuit board assembly cannot be tested by the manufacturer, an estimated cost of the testing procedures, an expected throughput of the tests performed by the manufacturer, yield estimates, or the like.

Figure 4:
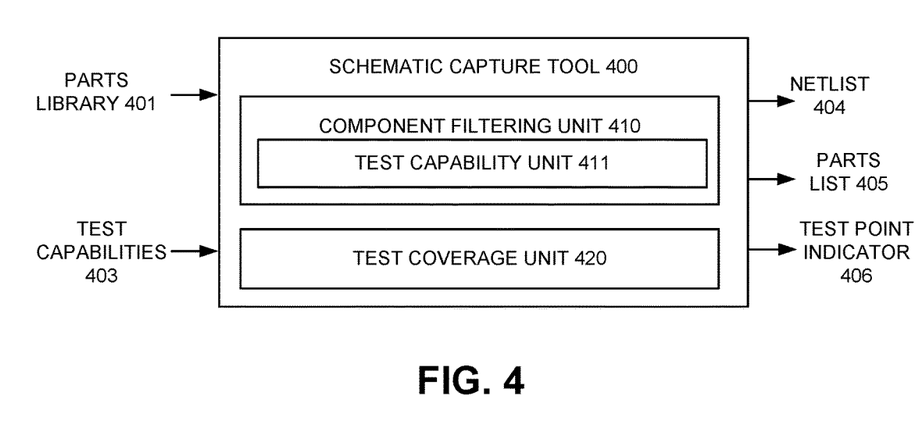
FIG. 4 illustrates an example of the schematic capture tool according to various embodiments.

FIG. 4 illustrates an example of a schematic capture tool 400 to utilize test capabilities 403 of a manufacturer to generate a logical design of a printed circuit board assembly according to various embodiments. Referring to FIG. 4, the schematic capture tool 400 can receive a parts library 401 and test capabilities 403 of a manufacturer, which can be similar to the parts library 301 and test capabilities 303 described above in FIG. 3.

The schematic capture tool 400 can generate a logical design for the printed circuit board assembly, which can include a netlist 404 and a parts list 405. The netlist 404 and the parts list 405 can be similar to the netlist 311 and the parts list 312 described above in FIG. 3. In some embodiments, the schematic capture tool 400 can generate a display presentation that, when presented by a display device, can provide a design environment for development of the logical design for the printed circuit board assembly. The schematic capture tool 400 can receive user input via a user interface, for example, selection of one or more parts from the parts library 401 for inclusion in the logical design. The display presentation may add schematic diagrams of the selected parts to the design environment and interconnect them in response to the user input. The schematic capture tool 400 can convert the schematic diagrams and interconnections from the design environment into the netlist 404 and the parts list 405.

The schematic capture tool 400 can include a component filtering unit 410 to select which of the parts in the parts library 401 to make available for inclusion in the logical design of the printed circuit board assembly. The component filtering unit 410 can include a test capability unit 411 to exclude one or more of the parts in the parts library 401 parts from being included in the logical design for the printed circuit board assembly based on the test capabilities 403. In some embodiments, the test capability unit 411 can utilize the test capabilities 403 to identify which of the parts represent electronic components that, if included in the printed circuit board assembly, would be untestable by the manufacturer and remove the ability of untestable parts from being included in the logical design for the printed circuit board assembly. For example, when a part in the parts library 401 corresponds to a Ball Grid Array (BGA) package, a test of an electronic component represented by that part would be performed by an x-ray test, as the pins lie underneath the electronic component when disposed on the printed circuit board assembly. When the test capabilities 403 for the manufacturer do not include the ability to perform an x-ray test, such as an Automated X-Ray Inspection (AXI) test, the test capability unit 411 can exclude the part from being utilized in the logical design for the printed circuit board assembly. In some embodiments, the test capability unit 411 can perform this exclusion by removing the part from view from a designer utilizing the design environment or by rendering the part unselectable in response to user input.

In some embodiments, when the test capability unit 411 identifies a testable part in the part library 401 based on the test capabilities 403, the test capability unit 411 also may determine whether to selectively exclude the testable part from being utilized in the logical design for the printed circuit board assembly. The test capability unit 411 may analyze the testable parts based on the various tests procedures or test equipment have differing test throughput, accuracy, expense, or the like, which could be utilized by the manufacturer. For example, when a first part is testable by an x-ray test and a second part, interchangeable with the first part, is testable by a different test, such as an Automated Optical Inspection (AOI) test, the test capability unit 411 may selectively exclude the first part from being utilized in the logical design for the printed circuit board assembly. In some embodiments, rather than exclude the first part from being utilized, the test capability unit 411 may annotate the first part to convey the added test expense, reduce test throughput, reduced accuracy, or other differences with the second part, to the designer utilizing the first part in the logical design for the printed circuit board assembly.

In another example, the test capability unit 411 also may filter the parts in the parts library 401 based on previous utilization of other parts in the logical design. For example, when the development of the logical design includes parts representing electronic components testable by one type of electrical test or inspection test, the test capability unit 411 may exclude parts in the parts library 401 from being utilized in the logical design for the printed circuit board assembly that would introduce a different type of electrical test or inspection test. This part exclusion may be able to eliminate the manufacturer having to perform multiple electrical tests or inspection tests, or to prohibit switching the testing from one type of testing, for example, a cheaper, faster, and/or more accurate testing type, to a different testing type through the inclusion of certain parts into the logical design. In some embodiments, rather than exclude the parts from being utilized, the test capability unit 411 may annotate the parts to convey the added test expense, reduce test throughput, reduced accuracy, or the like, to the designer utilizing the parts in the logical design for the printed circuit board assembly.

The schematic capture tool 400 can include a test coverage unit 420 to assign test points corresponding to nets in the logical design based on the parts library 401 and/or the test capabilities 403. The test points can correspond to physical structures in the printed circuit board assembly that can allow testing equipment electrical access to test electronic components and their connectivity in the printed circuit board assembly.

The test coverage unit 420 can identify an amount of space in the printed circuit board assembly available for test points. In some embodiments, the test coverage unit 420 can analyze physical characteristics of electronic components represented by parts in the logical design, for example, from the parts library 401, to identify the amount of space in the printed circuit board assembly available for test points. The test coverage unit 420 can utilize the parts library 401 to determine physical characteristics of the electrical components represented by the parts in the logical design, such as their footprint, size, and/or shape. The test coverage unit 420 can identify a difference between the total amount of space on the printed circuit board and the space utilized by the parts in the logical design based on the determined physical characteristics. This difference can correspond to the amount of space in the printed circuit board assembly available for test points.

The test coverage unit 420 can utilize the determined amount of space available for test points and the test capabilities 403 of the manufacturer to assign test points in the logical design. The test coverage unit 420 can determine a number of test points that could be included on the printed circuit board assembly based on the amount of space available for test points and a test point size. Since a type of test point added to a printed circuit board assembly can vary, for example, depending on the type of testing to be performed by the manufacturer, the test coverage unit 420 can identify the type of testing to be performed by the manufacturer based on the test capabilities 403 and the types of parts utilized in the logical design, and then select a type of test point to assign.

In some embodiments, the test coverage unit 420 may attempt to ensure every net in the logical design is testable. The test coverage unit 420 can identify which of the nets in the logical design may be tested without a test point. For example, a boundary scan test may be able to test multiple nets located on the printed circuit board assembly without utilizing test points. The test coverage unit 420 can identify whether the manufacturer can perform a boundary scan test or other test without the use of test points, identify which of the nets in the logical design can be tested by the boundary scan test or the like, and assign test points to correspond to the other nets in the logical design.

In some embodiments, the assignment of test points to nets in the logical design by the test coverage unit 420 can include an annotation of which nets should have corresponding test points in a layout design or physical design and in manufactured printed circuit board assemblies. This annotation can be inserted assignment of test points into the netlist 404 and/or parts list 405 or the assignment of test points can be outputted separately as a test point indicator 406. The assignment of test points can direct, prompt, or advise downstream tools, such as a printed circuit board layout tool, where to include test points into a physical design of the printed circuit board assembly.

Figure 5:
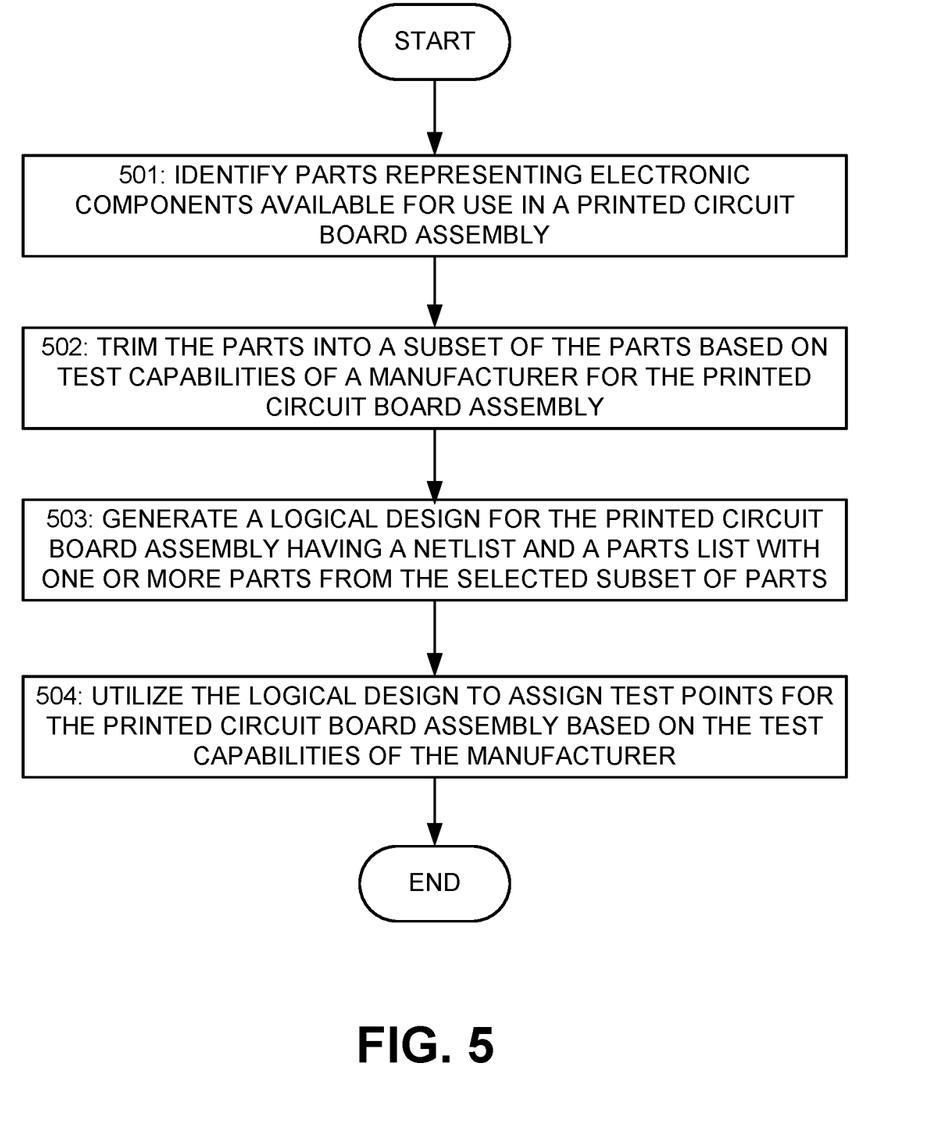
FIG. 5 illustrates an example flowchart for utilizing test capabilities of a manufacturer to generate a logical design of a printed circuit board assembly according to various embodiments.

FIG. 5 illustrates an example flowchart for utilizing test capabilities of a manufacturer to generate a logical design of a printed circuit board assembly according to various embodiments. Referring to FIG. 5, in a block 501, a computing system implementing a schematic capture tool can identify parts representing electronic components available for use in a printed circuit board assembly. In some embodiments, the schematic capture tool can receive or have access to a parts library, which can include descriptions of parts available for inclusion in a logical design of the printed circuit board assembly. The parts may include a description of the electronic components they represent, such as functional descriptions, physical characteristics, or the like of the electronic components they represent.

In a block 502, the schematic capture tool can trim the parts into a subset of the parts based on test capabilities of a manufacturer for the printed circuit board assembly. For example, the schematic capture tool can automatically exclude certain parts from the parts library from being included in the logical design for the printed circuit board assembly due to test considerations, such as an ability for the manufacturer to test the electronic components in the printed circuit board assembly, cost of testing associated with utilizing the electronic components in the printed circuit board assembly, testing throughput, testing accuracy, or the like.

The test capabilities can describe types of tests the manufacturer can perform on the printed circuit board assembly, which equipment the manufacturer can utilize to perform the tests on the printed circuit board assembly, a throughput of the tests and test equipment, an expense associated with the tests, or the like. In some embodiments, the manufacturer may support or be able to perform one or more of an Automated Optical Inspection (AOI) test, an Automated X-Ray Inspection (AXI) test, an In-circuit Test (ICT), a Boundary Scan test, a Flying Probe Test (FPT), manual inspection tests, manual electrical tests, or the like.

The schematic capture tool can utilize the test capabilities to identify which of the parts represent electronic components that, if included in the printed circuit board assembly, would be untestable by the manufacturer and remove the ability of untestable parts from being included in the logical design for the printed circuit board assembly. In some embodiments, the schematic capture tool can perform this exclusion by removing the part from view from a designer utilizing a design environment or by rendering the part unselectable in response to user input.

In some embodiments, when the schematic capture tool identifies a testable part in the part library based on the test capabilities, the schematic capture tool also can determine whether to selectively exclude the testable part from being utilized in the logical design for the printed circuit board assembly. The schematic capture tool can analyze the testable parts based on the various tests procedures or test equipment have differing test throughput, accuracy, expense, or the like, which could be utilized by the manufacturer, and may selectively exclude one or more of the testable parts from being utilized in the logical design for the printed circuit board assembly. In some embodiments, rather than exclude testable parts from being utilized, the schematic capture tool may annotate one or more of the testable parts to convey the added test expense, reduce test throughput, reduced accuracy, or other differences with the other testable parts. The testable parts also may filter the parts in the parts library based on previous utilization of other parts in the logical design, for example, excluding parts in the parts library 401 from being utilized in the logical design for the printed circuit board assembly that would introduce a different type of electrical test or inspection test.

In a block 503, the schematic capture tool can generate a logical design for the printed circuit board assembly, which includes a netlist and a parts list having one or more of the parts from the selected subset of the parts. The netlist, for example, specified in an Electronic Design Interchange Format (EDIF), can describe nets or connectivity between various components or instances. The parts list can include multiple parts from the parts library, which can correspond to the components or instances described in the netlist.

The schematic capture tool can provide an electronic design environment, which can build or generate the logical design based on user input. For example, the schematic capture tool can generate a display presentation that, when presented by a display device, can provide the electronic design environment for development of the logical design for the printed circuit board assembly. The schematic capture tool can receive the user input via a user interface, for example, selection of one or more parts from the parts library for inclusion in the logical design. The display presentation may add schematic diagrams of the selected parts to the design environment and interconnect them in response to the user input. The schematic capture tool can convert the schematic diagrams and interconnections from the design environment into the netlist and the parts list.

In a block 504, the schematic capture tool can utilize the logical design to assign test points for the printed circuit board assembly based on the test capabilities of the manufacturer. The test points can correspond to physical structures in the printed circuit board assembly that can allow testing equipment electrical access to test electronic components and their connectivity in the printed circuit board assembly. In some embodiments, the schematic capture tool can analyze the test capabilities of the manufacturer to identify which of the nets in the logical design can be tested without adding one or more test points, and then assign the test points for the printed circuit board assembly to other nets in the logical design.

The schematic capture tool can assign test points to nets in the logical design by including an annotation of which nets should have corresponding test points in a physical design of a printed circuit board assembly. The schematic capture tool can insert the assignment of test points into the logical design or output the assignment separately as a test point indicator. The assignment of test points can direct, prompt, or advise downstream tools, such as a printed circuit board layout tool, where to include test points into the physical design of the printed circuit board assembly.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   identifying, by a schematic capture tool implemented with a computing system, parts representing electronic components available for use in a printed circuit board assembly;
   selecting, by the schematic capture tool, a subset of the parts representing the electronic components based, at least in part, on physical test capabilities of a manufacturer for the printed circuit board assembly; and
   generating, by the schematic capture tool, a logical design for the printed circuit board assembly, wherein the logical design includes a netlist and a parts list having one or more of the parts from the selected subset of the parts, and wherein the printed circuit board assembly, when manufactured based on the logical design, includes one or more electronic components corresponding to the selected subset of the parts in the logical design.

2. The method of claim 1, wherein selecting the subset of the parts further comprises identifying which test procedures to utilize to test the electronic components corresponding to the parts and selecting the subset of the parts based on the identified test procedures and physical test capabilities of the manufacturer.

3. The method of claim 2, wherein selecting the subset of the parts further comprises excluding at least one of the identified parts from the subset of the parts when the manufacturer does not have the physical test capabilities to perform the identified test procedures corresponding to the at least one of the identified parts.

4. The method of claim 1, further comprising assigning, by the schematic capture tool, test points for the printed circuit board assembly based on the physical test capabilities of the manufacturer.

5. The method of claim 4, wherein the assigned test points are configured to identify nets in the logical design of the printed circuit board assembly that are to have the corresponding test points in a layout design of the printed circuit board assembly.

6. The method of claim 1, wherein the physical test capabilities associated with the manufacturer includes an identification of test equipment available to the manufacturer.

7. The method of claim 1, wherein the selected subset of the parts includes one or more of the parts having physical characteristics capable of being tested by test equipment utilized by the manufacturer.

8. A system comprising:
   a memory device configured to store machine-readable instructions; and
   a computing system including one or more processing devices, in response to executing the machine-readable instructions, configured to:
      identify parts representing electronic components available for use in a printed circuit board assembly;
      select a subset of the parts representing the electronic components based, at least in part, on physical test capabilities of a manufacturer for the printed circuit board assembly; and
      generate a logical design for the printed circuit board assembly, wherein the logical design includes a netlist and a parts list having one or more of the parts from the selected subset of the parts, and wherein the printed circuit board assembly, when manufactured based on the logical design, includes one or more electronic components corresponding to the selected subset of the parts in the logical design.

9. The system of claim 8, wherein the one or more processing devices, in response to executing the machine-readable instructions, are further configured to select the subset of the parts by identifying which test procedures to utilize to test the electronic components corresponding to the parts and selecting the subset of the parts based on the identified test procedures and physical test capabilities of the manufacturer.

10. The system of claim 9, wherein the one or more processing devices, in response to executing the machine-readable instructions, are further configured to select the subset of the parts by excluding at least one of the identified parts from the subset of the parts when the manufacturer does not have the physical test capabilities to perform the identified test procedures corresponding to the at least one of the identified parts.

11. The system of claim 8, wherein the one or more processing devices, in response to executing the machine-readable instructions, are configured to assigning test points for the printed circuit board assembly based on the physical test capabilities of the manufacturer.

12. The system of claim 11, wherein the assigned test points are configured to identify nets in the logical design of the printed circuit board assembly that are to have the corresponding test points in a physical design of the printed circuit board assembly.

13. The system of claim 8, wherein the selected subset of the parts includes one or more of the parts having physical characteristics capable of being tested by test equipment utilized by the manufacturer.

14. An apparatus comprising at least one computer-readable memory device storing instructions configured to cause one or more processing devices to perform operations comprising:
   identifying parts representing electronic components available for use in a printed circuit board assembly;
   selecting a subset of the parts representing the electronic components based, at least in part, on physical test capabilities of a manufacturer for the printed circuit board assembly; and
   generating a logical design for the printed circuit board assembly, wherein the logical design includes a netlist and a parts list having one or more of the parts from the selected subset of the parts, and wherein the printed circuit board assembly, when manufactured based on the logical design, includes one or more electronic components corresponding to the selected subset of the parts in the logical design.

15. The apparatus of claim 14, wherein selecting the subset of the parts further comprises identifying which test procedures to utilize to test the electronic components corresponding to the parts and selecting the subset of the parts based on the identified test procedures and physical test capabilities of the manufacturer.

16. The apparatus of claim 15, wherein selecting the subset of the parts further comprises excluding at least one of the identified parts from the subset of the parts when the manufacturer does not have the physical test capabilities to perform the identified test procedures corresponding to the at least one of the identified parts.

17. The apparatus of claim 14, wherein the instructions configured to cause the one or more processing devices to perform operations further comprising assigning test points for the printed circuit board assembly based on the physical test capabilities of the manufacturer.

18. The apparatus of claim 17, wherein the assigned test points are configured to identify nets in the logical design of the printed circuit board assembly that are to have the corresponding test points in a layout design of the printed circuit board assembly.

19. The apparatus of claim 14, wherein the physical test capabilities associated with the manufacturer includes an identification of test equipment available to the manufacturer.

20. The apparatus of claim 14, wherein the selected subset of the parts includes one or more of the parts having physical characteristics capable of being tested by test equipment utilized by the manufacturer.

\* \* \* \* \*